B. S. & J. Mellinger.
Horse Rake.

No. 35,245.  Patented May 13, 1862.

UNITED STATES PATENT OFFICE.

B. MELLINGER, S. MELLINGER, JR., AND J. MELLINGER, OF MOUNT PLEASANT, PENNSYLVANIA.

IMPROVEMENT IN HORSE-RAKES.

Specification forming part of Letters Patent No. 35,245, dated May 13, 1862.

*To all whom it may concern:*

Be it known that we, B. MELLINGER, S. MELLINGER, Jr., and J. MELLINGER, all of Mount Pleasant, in the county of Westmoreland and State of Pennsylvania, have invented a new and Improved Horse-Rake; and we do hereby declare that the following is a full, clear, and exact description of the same, reference being had to the accompanying drawings, making a part of this specification, in which—

Figure 1:
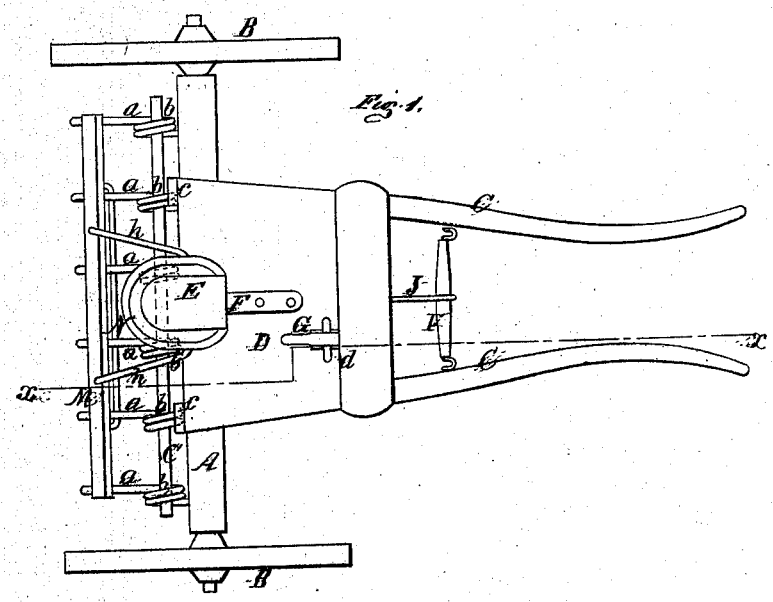
Figure 2:
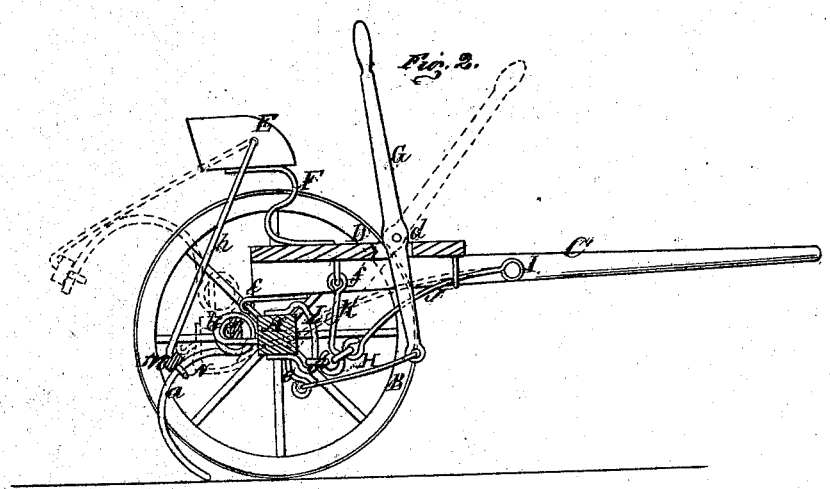

Figure 1 is a plan or top view of our invention; Fig. 2, a side sectional view of the same, taken in the line $x\ x$, Fig. 1.

Similar letters of reference indicate corresponding parts in the two figures.

The object of this invention is to obtain a horse-rake in which the weight of the driver in his seat, in connection with the "pull" or draft movement of the horse, is made to keep the rake in a proper working position, the weight of the driver or operator keeping the rake in an elevated state.

To enable those skilled in the art to fully understand and construct our invention, we will proceed to describe it.

A represents the axle of the machine, and B B the wheels, which are placed loosely thereon. This axle A also forms the head of the rake and has curved wire teeth $a$ attached to it, which have one or more spiral convolutions, $b$, through which a bar, C, passes in order to give strength and elasticity to the springs. This arrangement, however, is common to almost all wire-tooth horse-rakes.

C' C' represent the thills of the machine, attached at their back ends to the axle and rake-head A by means of joints $c\ c$, the latter being at the upper edge of the back part of the axle.

On the back parts of the thills there is a platform, D, to which the driver's seat E is secured by an elastic support, F; and G is a lever, the fulcrum-pin $d$ of which is at the surface of the platform D. The lever G projects down below the platform D, and is connected at its lower end with the axle and rake-head A by a link, H, the back end of which is connected to a pendent arm, $e$, attached to the axle. (See Fig. 2.)

I represents the whiffletree of the implement or machine, to which the horse is attached, as usual. This whiffletree is connected by a rod, J, to the lower end of a stay-rod, K, the upper end of which is connected by a joint, $f$, to the under side of the platform D. The lower end of this stay-rod is also connected by a short link or ring, $g$, to a segment-shaped clevis, L, which is attached to the front side of the axle and rake-head A. This clevis extends down a little below the bottom of the axle and rake-head, as shown clearly in Fig. 2, and the ring $g$ is allowed to work freely on it.

To the driver's seat E there are attached two rods, $h\ h$, one at each side. These rods project back of the driver's seat, and a bar, M, is attached to them, which is parallel with the axle and rake-head A. The bar M has a metal loop, N, at its under side, through which the teeth $a$ of the rake pass, the outermost teeth being excepted.

The operation is as follows: As the machine is drawn along the thills C' C' are about parallel with the upper surface of the axle and rake-head A, and the teeth $a$ are kept down to their work by the weight of the driver or operator on seat E, in consequence of the connection of the thills C' C' being at the upper edge of the back part of the axle and rake-head, and also in consequence of the pull or draft of the horse being at the lower part of the clevis L, at which point the ring $g$ of the stay-rod K is placed when the implement or machine is at work. (See Fig. 2.) When the teeth $a$ have gathered up a load in front of them the operator or driver shoves forward the upper end of lever G, and thereby turns the axle or rake-head A, so as to elevate the teeth $a$ of the rake and cause the joints $c\ c$, which connect the thills with the axle or rake-head, to be at the front side of the latter, as shown in red in Fig. 2, said movement of the axle and rake-head also causing the ring $g$ of the stay-rod K to be at the upper end of the clevis L. In this position of the parts it will be seen that the weight of the driver or operator on seat E has a tendency to keep the teeth elevated free from the ground in consequence of the joints $c\ c$ or points of connection of the thills C' with the axle or rake-head A being at the front side of the latter, and when the rake is to be depressed a very slight pull on lever G will suffice to effect the object, owing to the draft movement or pull of the horse, which assists in depressing it. The rake therefore may be elevated with but a trifling exertion on the part of the driver or operator, and when elevated the weight of the driver will keep it in such position. The bar M serves to prevent the hay or other substance raked up by it rising with the teeth $a$ when the same are elevated to discharge the load.

The within-described horse-rake, having no cog-gearing, catches, or fastenings of any kind to operate, can be worked with great facility by a boy or any one competent to drive a horse.

Having thus described our invention, what we claim as new, and desire to secure by Letters Patent, is—

Attaching the thills C' C' to the axle and rake-head A by joints $c$ $c$ at the back part of the axle and rake-head, in combination with the whiffletree I, attached to a segment-clevis, L, on the axle and rake-head A by means of a stay-rod, K, and rod J, all arranged and operating as and for the purpose specified.

B. MELLINGER.
    S. MELLINGER, Jr.
    JOHN MELLINGER.

Witnesses:
 T. SHEPPARD,
 J. WEITZEL.